US007787423B2

(12) United States Patent
Komiya et al.

(10) Patent No.: US 7,787,423 B2
(45) Date of Patent: Aug. 31, 2010

(54) DEVICE AND PROGRAM PRODUCT FOR THE SAME

(75) Inventors: Daisaku Komiya, Yokohama (JP); Takao Nishiyama, Kamakura (JP); Toshimasa Takaki, Tokyo (JP); Masaki Takahashi, Tokyo (JP)

(73) Assignee: Panasonic Corporation, Osaka (JP)

(*) Notice: Subject to any disclaimer, the term of this patent is extended or adjusted under 35 U.S.C. 154(b) by 1226 days.

(21) Appl. No.: 10/936,100

(22) Filed: Sep. 8, 2004

(65) Prior Publication Data

US 2005/0053017 A1 Mar. 10, 2005

(30) Foreign Application Priority Data

Sep. 10, 2003 (JP) ........................ P. 2003-318359
Sep. 10, 2003 (JP) ........................ P. 2003-318422
Apr. 19, 2004 (JP) ........................ P. 2004-122602

(51) Int. Cl.
*H04W 4/04* (2009.01)

(52) U.S. Cl. ...................... 370/338; 370/255; 455/41.2; 455/414.1

(58) Field of Classification Search .............. 340/407.1; 370/465, 349, 312, 352, 255, 338; 455/436, 455/450, 456.3, 414.1, 41.2; 705/50; 709/203, 709/219
See application file for complete search history.

(56) References Cited

U.S. PATENT DOCUMENTS

| | | | | |
|---|---|---|---|---|
| 6,115,611 | A * | 9/2000 | Kimoto et al. | 455/456.3 |
| 6,633,761 | B1 * | 10/2003 | Singhal et al. | 455/436 |
| 6,643,284 | B1 | 11/2003 | Inoue et al. | |
| 6,763,236 | B2 * | 7/2004 | Siren | 455/450 |
| 6,809,635 | B1 * | 10/2004 | Kaaresoja | 340/407.1 |
| 6,842,460 | B1 * | 1/2005 | Olkkonen et al. | 370/465 |
| 7,151,764 | B1 * | 12/2006 | Heinonen et al. | 370/338 |
| 7,249,100 | B2 * | 7/2007 | Murto et al. | 705/50 |
| 7,272,407 | B2 * | 9/2007 | Strittmatter et al. | 455/500 |
| 7,424,302 | B2 * | 9/2008 | Carpenter | 455/466 |
| 7,536,182 | B2 * | 5/2009 | Zhang | 455/420 |
| 7,565,158 | B1 * | 7/2009 | Aholainen | 455/458 |
| 7,570,943 | B2 * | 8/2009 | Sorvari et al. | 455/414.1 |

(Continued)

FOREIGN PATENT DOCUMENTS

CN 1342284 3/2002

(Continued)

OTHER PUBLICATIONS

Japanese Office Action dated Mar. 6, 2009.

(Continued)

*Primary Examiner*—William Trost, IV
*Assistant Examiner*—Emmanuel Maglo
(74) *Attorney, Agent, or Firm*—Pearne & Gordon LLP

(57) ABSTRACT

A device in a PAN 7 having a plurality of devices 1 to 6 connected by short range communication whose network configuration dynamically changes is provided. A cellphone 1 includes a discovery function to discovery the devices 2 to 6 for a device capable of carrying out prescribed processing based on a request for execution of the prescribed processing from the cellphone 1 and a transmission control function to transmit output control information for outputting a notice indicating the capability of carrying out the prescribed information to the devices found by the discovery.

33 Claims, 12 Drawing Sheets

U.S. PATENT DOCUMENTS

| | | | | |
|---|---|---|---|---|
| 7,584,269 | B2 * | 9/2009 | Moore et al. | 709/219 |
| 2002/0184304 | A1 * | 12/2002 | Meade et al. | 709/203 |
| 2003/0112329 | A1 * | 6/2003 | Thomason | 348/52 |
| 2003/0112789 | A1 * | 6/2003 | Heinonen et al. | 370/349 |
| 2003/0231748 | A1 * | 12/2003 | Novelline | 379/88.23 |

FOREIGN PATENT DOCUMENTS

| | | | |
|---|---|---|---|
| JP | 09-154077 | | 6/1997 |
| JP | 09-261227 | A | 10/1997 |
| JP | 2000-115253 | A | 4/2000 |
| JP | 2000-244836 | | 9/2000 |
| JP | 2000-305885 | A | 11/2000 |
| JP | 2002-091737 | A | 3/2002 |
| JP | 2002-101104 | A | 4/2002 |
| JP | 2002-232435 | A | 8/2002 |
| JP | 2002-305521 | | 10/2002 |
| JP | 2002-315078 | A | 10/2002 |
| JP | 2003-18886 | A | 7/2003 |
| JP | 2003-229808 | A | 8/2003 |
| JP | 2005-082790 | A | 3/2005 |
| WO | 03/003610 | A1 | 1/2003 |

OTHER PUBLICATIONS

Japanese Office Action dated Apr. 1, 2009.
Chinese Office Action dated Aug. 28, 2009.

* cited by examiner

FIG. 4A

| ID | KIND | OWNER | AUTHORIZED USER | FEE | LOCATION | DIRECTION | SPECIFICATION 1 | SPECIFICATION 2 |
|---|---|---|---|---|---|---|---|---|
| Term01 | TV | | EVERYONE | | E. LONGITUDE 133.33.18.55<br>N. LATITUDE 35.25.19.43<br>ALTITUDE 1 | EAST-NORTHEAST | SIZE32 | MPEG4 |
| Term02 | TV | *YAMADA* | *YAMADA, ISHIKAWA* | | E. LONGITUDE 133.33.18.39<br>N. LATITUDE 35.25.19.19<br>ALTITUDE 1 | NORTH | SIZE14 | |
| Term18 | PROJECTOR | PROJECT TEAM | *YAMAMOTO, KATO* | 100 YEN | E. LONGITUDE 133.33.18.20<br>N. LATITUDE 35.25.19.40<br>ALTITUDE 3 | SOUTH | SIZE50 | |
| Term24 | PDA | *SUZUKI* | *SUZUKI* | | E. LONGITUDE 133.33.18.20<br>N. LATITUDE 35.25.19.42<br>ALTITUDE 1 | SOUTH | SIZE3.2 | |
| | | | | | :<br>: | | | |
| TermXX | PC LCD | | *KATO* | | E. LONGITUDE 133.33.18.18<br>N. LATITUDE 35.25.19.18<br>ALTITUDE 1 | NORTH WEST | SIZE12 | |

FIG. 4B

| ID | KIND | OWNER | AUTHORIZED USER | FEE | LOCATION | DIRECTION | SPECIFICATION 1 | SPECIFICATION 2 |
|---|---|---|---|---|---|---|---|---|
| Term01 | TV | | EVERYONE | | E. LONGITUDE 133.33.18.55<br>N. LATITUDE 35.25.19.43<br>ALTITUDE 1 | EAST-NORTHEAST | SIZE32 | MPEG4 |
| Term02 | TV | *YAMADA* | *YAMADA, ISHIKAWA* | | E. LONGITUDE 133.33.18.39<br>N. LATITUDE 35.25.19.19<br>ALTITUDE 1 | NORTH | SIZE14 | |
| Term18 | PROJECTOR | PROJECT TEAM | *YAMAMOTO, KATO* | 100 YEN | E. LONGITUDE 133.33.18.20<br>N. LATITUDE 35.25.19.40<br>ALTITUDE 3 | SOUTH | SIZE50 | |
| Term24 | PDA | *SUZUKI* | *SUZUKI* | | E. LONGITUDE 133.33.18.20<br>N. LATITUDE 35.25.19.42<br>ALTITUDE 1 | SOUTH | SIZE3.2 | |
| : | | | | | | | | |
| TermXX | PC LCD | | *KATO* | | E. LONGITUDE 133.33.18.18<br>N. LATITUDE 35.25.19.18<br>ALTITUDE 1 | NORTH WEST | SIZE12 | |

| ID | ORDER | INTERVAL |
|---|---|---|
| PC 6 | FIRST | 5 SEC |
| TV 4 | NEXT TO PC 6 | 5 SEC |
| TV 3 | NEXT TO TV 4 | 5 SEC |
| PDA 2 | NEXT TO TV 3 | 5 SEC |

DEVICE AND PROGRAM PRODUCT FOR THE SAME

BACKGROUND OF THE INVENTION

1. Field of the Invention

The invention relates to any of a plurality of devices in a network which has the devices connected by short range communication in a dynamically changing network configuration. The present invention also relates to a program product applied for the devices.

2. Description of the Related Art

In recent years, various techniques using PAN (Personal Area Network) have been suggested. PAN is a network that includes devices such as cellphones, computers, and electrical appliances for home use and is capable of enabling short range communication among these devices on an ad-hoc basis by their wireless communication functions for example by Bluetooth technology. When a user having a cellphone capable of wireless communication for example by Bluetooth technology comes into the communication area of a PAN, the cellphone is added as a part of the PAN, and the network configuration of the plurality of devices dynamically changes.

One suggested service using a PAN is to allow image data stored in the memory of a cellphone to be transferred to another device having a display in the PAN, so that an image based on the image data is displayed on the display of the latter device.

In this service, the cellphone transmitting the image data discoveries for devices capable of carrying out the service among the plurality of devices in the PAN and displays IDs to specify the found devices in the form of a list on the display of the cellphone. Then, when the user of the cellphone selects one of the IDs in the list displayed on the display, the cellphone transfers the image data to the device corresponding, to the selected ID. In this way, the image is displayed at the device selected by the user.

Note that techniques related to such a network having devices such as a plurality of input/output devices and AV equipment and a computer connected with one another are disclosed for example by Japanese Patent Laid-Open Nos. 2000-244836, H09-154077, and 2002-305521.

In the conventional service as described above, when there are an enormous number of devices capable of carrying out the service, a list of IDs as many as the enormous number is displayed on the display. In this case, the user of the cellphone cannot effortlessly discern at a glance which is appropriately capable of carrying out the service among the enormous number of IDs and therefore inevitably spends much time for selecting a device.

The conventional service described above suffers from disadvantages related to difficulty in determination when a plurality of people try to use devices located close to one another at a time, processing when a plurality of users try to use the same device at the same time, and privacy protection for users when the content of a call changes. Furthermore, once a device moves and the network configuration of the group of devices capable of communication changes, a device selected based on a discovery result before the change might be no longer available for communication.

SUMMARY OF THE INVENTION

The present invention is directed to a solution to the above described disadvantages, and it is an object of the invention to provide in a network having a plurality of devices connected by short range communication whose network configuration dynamically changes, a device capable of selection assisting for surely selecting a desired, actually available device among the plurality of devices.

A device according to the invention is included in a network having a plurality of devices connected with one another by short range communication and serves as a service request terminal or service providing terminal. The network configuration of the devices dynamically changes. The device includes discovery means for discovering for a device working as a service providing terminal capable of carrying out prescribed processing based on a request issued by a device working as a service request terminal, terminal information obtaining means for obtaining terminal information indicating the status of a device found by the discovery, and filtering means for filtering the devices found by the discovery using the terminal information.

In the above network configuration, by the filtering means for filtering the devices found by the discovery using the terminal information indicating the status of the devices, the devices can be discovered based on the capability of carrying out prescribed processing and then can be extracted depending on the actual availability, is so that selection assisting for surely selecting a desired, actually available device can be achieved even when the network configuration of the communicable/available devices changes because of the movement of devices or change in the availability.

A device according to the invention is included in a network having a plurality of devices connected with one another by short range communication and serves as a service request terminal or service providing terminal. The network configuration of the devices dynamically changes. The device includes obtaining means for obtaining output control information from a device working as a service request terminal when the device is found by discovery as a device working as a service providing terminal capable of carrying out prescribed processing based on a request issued by the device working as the service request terminal and extracted using terminal information indicating the status of the device found by the discovery. The output control information is used for outputting a notice that indicates the capability of carrying out the prescribed processing based on the request for executing the prescribed processing issued by the device working as the service request terminal, and output control means for executing to output the notice based on the output control information.

In the above network configuration, the discovery is carried out based on the capability of carrying out the prescribed processing, and then devices extracted based on the actual availability are caused to create the output, so that selection assisting for surely selecting a desired, actually available device can be achieved even when the network configuration of the communicable/available devices changes because of the movement of devices or change in the availability.

According to the invention, in a network having a plurality of devices connected by short range communication whose network configuration dynamically changes, a device capable of selection assisting for surely selecting a desired, actually available device can be provided.

The present invention also provide a program product for controlling the above devices.

The program product is utilized for controlling a device in a short range wireless communication network, said program product comprising a computer usable medium having a computer readable program code therein, said computer readable program code comprising: program code means for issuing a service request regarding a prescribed processing; program code means for discovering and extracting devices from the network capable of performing the prescribed processing based on the service request; program code means for obtaining status information of the extracted devices; and program code means for selecting at least a device from the extracted devices based on the status information.

BRIEF DESCRIPTION OF THE DRAWINGS

FIGS. 4A and 4B are tables of specific examples of terminal information obtained from devices capable of an image display service;

Figure 1:
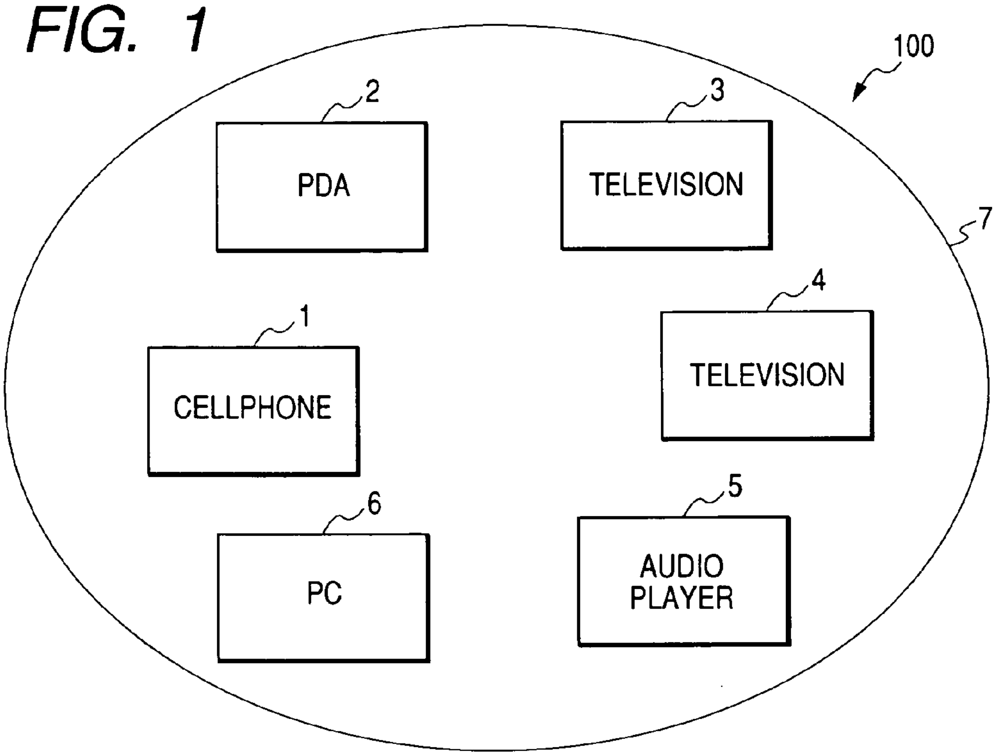
FIG. 1 is a schematic diagram of a terminal link system for use in illustration of a first embodiment of the invention.

In the drawings, a reference numeral 1 refers to a cellphone; 2 to a PDA; 3, 4 to a television; 5 to an audio player; 6 to a PC; and 7 to a PAN.

DETAILED DESCRIPTION OF THE PREFERRED EMBODIMENTS

First Embodiment

FIG. 1 is a schematic diagram of the network configuration of a terminal link system for use in illustration of a first embodiment of the invention.

The terminal link system 100 includes a plurality of devices such as a cellphone 1, a PDA (Personal Digital Assistant) 2, a television 3, a television 4, an audio player 5, and a personal computer (hereinafter referred to as "PC") 6 connected with a display. The devices have a wireless communication function by Bluetooth technology which allows a PAN 7 to form, so that short range wireless communication is enabled between each other on an ad-hoc basis. In the terminal link system 100, the cellphone 1 for example is no longer an element once the cellphone 1 is out of the communication area of the PAN 7, in other words, the elements dynamically change. Note that the wireless communication may be carried out by using an interface that allows short range communication other than by Bluetooth technology.

Now, the common network configuration of these devices will be described.

Figure 2:
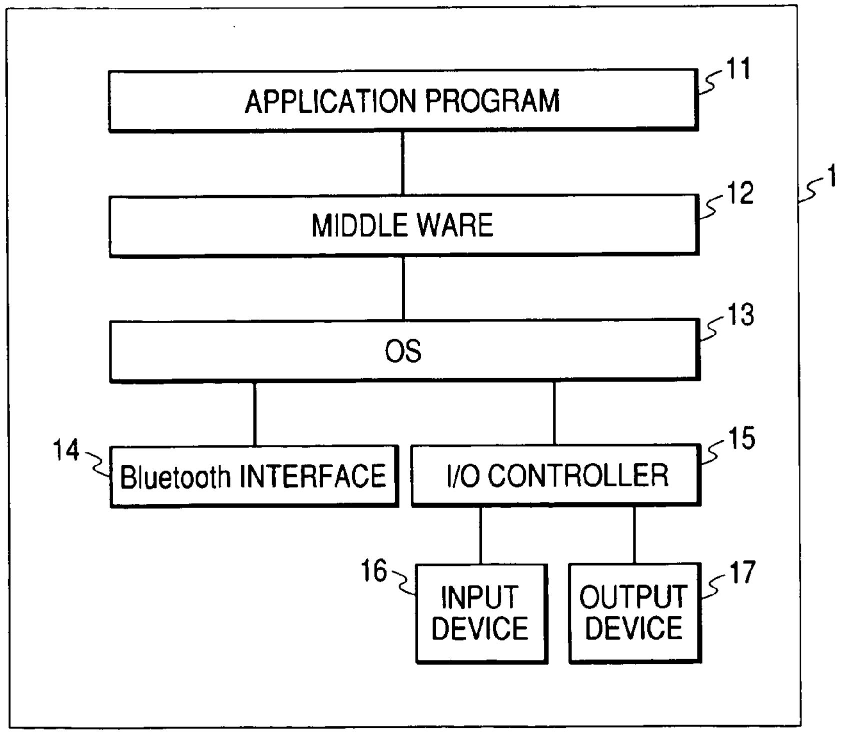
FIG. 2 is a schematic diagram of the system network configuration of devices in the terminal link system for use in illustration of the first embodiment.

FIG. 2 is a schematic diagram of the system network configuration of the devices in the terminal link system for use in illustration of the first embodiment. With reference to FIG. 2, the cellphone 1 will be described as a device by way of illustration.

As shown in FIG. 2, the cellphone 1 has a hierarchical structure made up of an application program (hereinafter referred to as "AP") 11, middle ware 12, and an operating system (hereinafter as "OS") 13. In the layers under the OS 13, there are a Bluetooth interface 14, an I/O controller 15, and an input device 16 and an output device 17 connected to the I/O controller 15. All the elements in the layer under OS are managed by the OS 13. The cellphone 1 is operated as a CPU (Central Processing Unit) that is not shown executes the AP 11, the middle ware 12, and the OS 13.

The AP 11 is a program for the cellphone 1 to execute a service using the PAN 7. Various services are provided such as an image display service to display an image based on image data transferred from another device on a display of its own and an audio sound output service to output audio sounds based on audio data transferred from another device from a speaker of its own. The contents of these services are different depending on the kind of the output device 17 of each device. According to the embodiment, the image display service can be provided by the cellphone 1, the PDA 2, the televisions 3 and 4, and the PC 6, while the audio sound output service can be provided by the audio player 5.

The input device 16 includes operation means such as a key button for the user of the device to carry out various kinds of operation. The output device 17 includes a display (display portion), a speaker, an LED (light emitting diode), and a vibrator. The I/O controller 15 controls the input device 16 and the output device 17.

Figure 3:
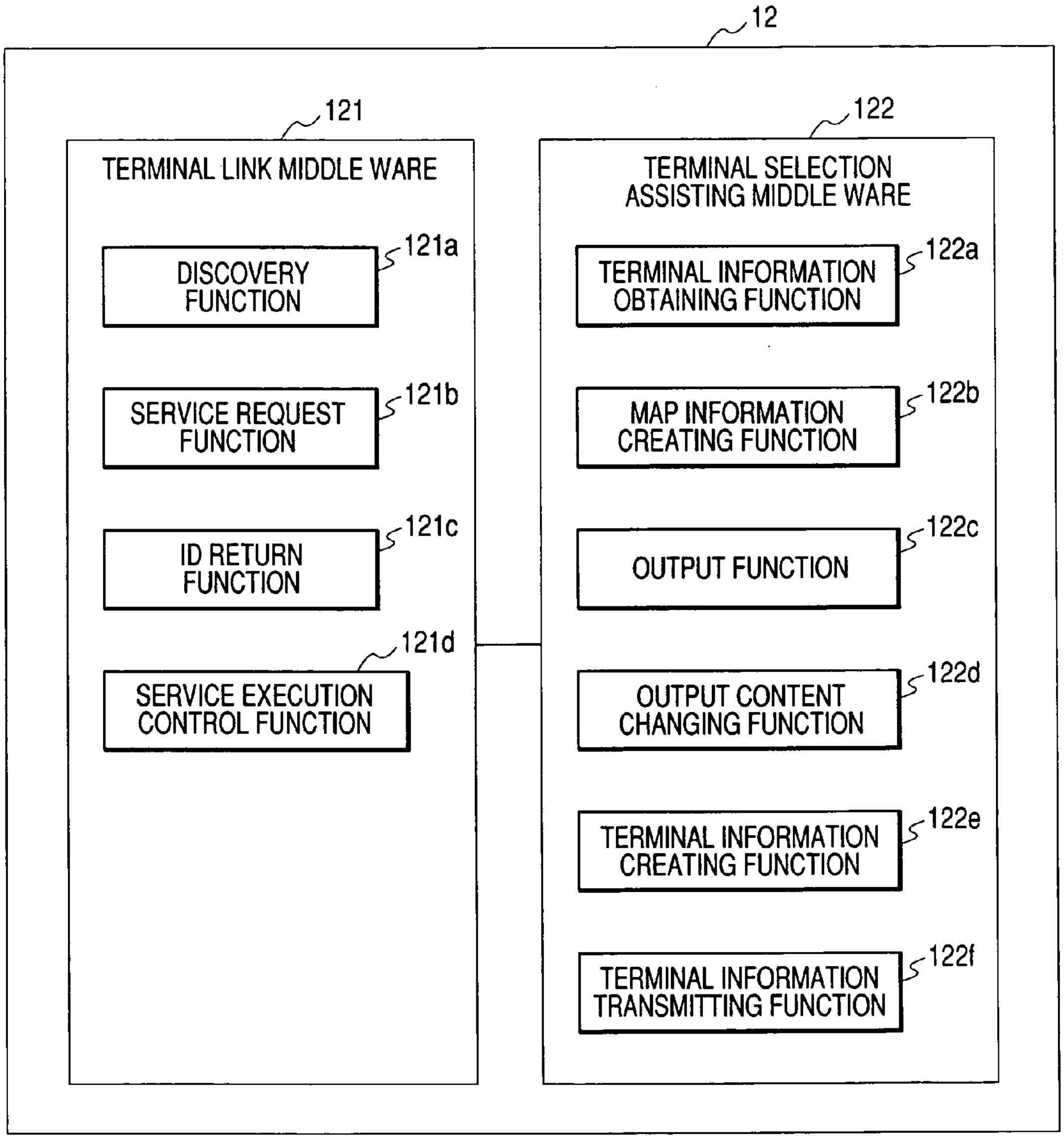
FIG. 3 is a diagram showing in detail the network configuration of the middle ware shown in FIG. 2.

FIG. 3 is a functional block diagram of the middle ware shown in FIG. 2.

The middle ware 12 includes terminal link middle ware 121 that manages linkage with another device and terminal selection assisting middle ware 122 that assists in selecting a device.

The terminal link middle ware 121 includes a discovery function 121*a*, a service request function 121*b*, an ID return function 121*c*, and a service execution control function 121*d*.

By the discovery function 121*a*, a device working as a service providing terminal capable of executing a request for prescribed processing issued by a device working as a service request terminal is discovered. When the user of the cellphone 1 is about to use an arbitrary service, devices capable of carrying out the service (prescribed processing) are discovered among all the devices in the PAN 7, and the discovery result is notified to the terminal selection assisting middle ware 122. More specifically, the devices are asked if they can carry out the arbitrary service through the OS 13 and the Bluetooth interface 14, and specifying information to specify the devices capable of carrying out the service (hereinafter referred to as "ID") returned from the devices is notified to the terminal selection assisting middle ware 122. The ID may for example be an IP address, a MAC address, and an address defined by the middle ware 12.

The service request function 121*b* accesses the device selected by the user of the cellphone 1 among the above devices found by the discovery through the OS 13 and the Bluetooth interface 14, transfers image data or audio sound data and requests the service to be executed.

The ID return function 121*c*, upon receiving the inquiry from another device, returns the ID of the cellphone 1 (such as the phone number) to the inquiring device when the cellphone can carry out the arbitrary service.

The service execution control function 121*d*, upon receiving image data or audio sound data transferred from another device and a request for carrying out the service, transfers the data to the AP 11 for carrying out the service.

The terminal selection assisting middle ware 122 includes a terminal information obtaining function 122*a*, a map information creating function 122*b*, an output function 122*c*, an output content changing function 122*d*, a terminal information creating function 122*e*, and a terminal information transmitting function 122*f*.

The terminal information obtaining function 122*a* obtains terminal information representing the status of a device found by discovery, accesses a device specified by an ID notified from the discovery function 121*a* through the OS 13 and the Bluetooth interface 14 and obtains the terminal information from the device. The terminal information represents characteristics or the status of a device and includes information such as the name and the present location of the device.

FIGS. 4A and 4B are tables showing examples of terminal information obtained from devices capable of carrying out an image display service.

As shown in FIG. 4A, the terminal information of the devices includes items such as "name," "owner," "authorized user," "fee," "location," "direction," "specification 1," and "specification 2."

The "authorized user" refers to a person capable of using (authorized to use) the device. The "fee" refers to a service fee generated for the user of the device on the service requesting side. The "location" indicates the present location of the device which is indicated in terms of latitude, longitude, and altitude. The "direction" indicates the direction in which the display surface of the display faces. The "specification" indicates the specification of the device. The "specification 1" indicates whether the device has a display or the display screen size or the like of the display for the device, and the "specification 2" indicates the image processing capability of the device.

As shown in FIG. 4B, the terminal information of the devices includes items such as "name," "owner," "privacy level," "fee," "location," "direction," "specification 1," and "specification 2." The "fee" and the like are as descried above, and the "privacy level" indicates the level of privacy protection function in using the device.

According to the embodiment, terminal information is directly obtained from a device specified by an ID, while when there is a server that manages the PAN 7, the terminal information may be obtained from the server. In this case, the server must obtain the terminal information from all the devices every time the network configuration of the PAN 7 changes, which can be achieved by known techniques. When the cellphone 1 is added to the network configuration of the PAN 7, the terminal information obtaining function 122*a* obtains the terminal information of all the devices from the server and holds the information in the internal memory in the cellphone 1, so that the terminal information of the device specified by the ID may be obtained from the internal memory.

The map information creating function 122*b* creates relative positional information (hereinafter referred to as "map information") indicating the relative positional relation between the cellphone 1 and the devices found by the discovery function 121*a* based on the positional information of the cellphone 1 and the positional information of the devices included in the terminal information. Note that the terminal selection assisting middle ware 122 obtains the positional information of the cellphone 1 using a GPS receiver or the like (not shown) provided in the cellphone 1 and holds the information in the internal memory. When there is a server that manages the PAN 7, the positional information of the cellphone 1 is obtained from the server and held in the internal memory. The terminal selection assisting middle ware 122 obtains the positional information of the cellphone 1 when the user carries out operation for executing an arbitrary service.

The map information created by the map information creating function 122*b* may be divided into a plurality of map information parts. When for example there are a large number of devices capable of carrying out a service, it would be difficult to check all the devices on a single map. Therefore, the map information is divided into a plurality of parts, so that not only the entire map but also a region on the map may be displayed enlarged on the display, and the above described problem is thus solved.

The output function 122*c* outputs the terminal information of the devices obtained by the terminal information obtaining function 122*a* or the map information described above to the output device 17 of the cellphone 1 and other devices. The output function 122*c* does not have to output all the items included in the terminal information and may output for example only information related to the "names" of the devices in the form of a list or information related to the "names" and "screen sizes" in the form of a list.

The output function 122*c* may output a combination of terminal information and map information to the output device 17 of the cellphone 1 and other devices. Information may be output so that icons representing the cellphone 1 and the devices found by discovery may be displayed in the form of a map at the display based on their relative positional relation, and the names or the like of the devices can be displayed in association with the icons.

When the output function 122*c* outputs terminal information to another device, the function selects at least one of the devices found by the discovery function 121*a* as the output destination using the terminal information as shown in FIGS. 4A and 4B. There are several selection variations, which will be described.

Variation 1: when an arbitrary service specified by the user of the cellphone 1 is an audio sound output service, at least one of the devices having a display capable of display based on terminal information among the devices found by the discovery function 121*a* is selected. When the arbitrary service specified by the user of the cellphone 1 is an image display service, the found devices should have displays, and therefore at least one of the found devices is selected.

Variation 2: In any of the above cases, the device having the largest screen size display is selected among the devices having displays.

Variation 3: In any of the above cases, the device in the closest location to the cellphone 1 is selected among the devices having displays.

Variation 4: In any of the above cases, a device having its display facing the cellphone 1 is selected among the devices having displays.

In connection with Variations 3 and 4, the positional information of the cellphone 1 held in the internal memory and the positional information of the devices shown in FIGS. 4A and 4B are compared for select the device.

Upon receiving terminal information or map information output from the output function 122*c* of a device other than the cellphone 1, the output function 122*c* can output the received terminal information or map information to the output device 17 of the cellphone 1.

The output content changing function 122*d* changes the content of terminal information output by the output function 122*c* according to the destination of the terminal information. When for example the output function 122*c* selects the device having the largest size screen, all the items of the terminal information shown in FIGS. 4A and 4B are output as the terminal information. Conversely, when the selected device has a small size screen, for example, only the "name" is output as the terminal information.

Once the cellphone 1 comes into the PAN 7, the terminal information creating function 122*e* creates terminal information as shown in FIGS. 4A and 4B based on fixed information such as the "name" and "fee" stored in the cellphone 1 and variable information such as the positional information of the cellphone 1.

The terminal information transmitting function 122*f* transmits terminal information created by the terminal information creating function 122*e* through the OS 13 and the Bluetooth interface 14 to another device in response to a request from the device.

Now, the operation of the cellphone 1 when the user uses an image display service will be described.

Figure 5:
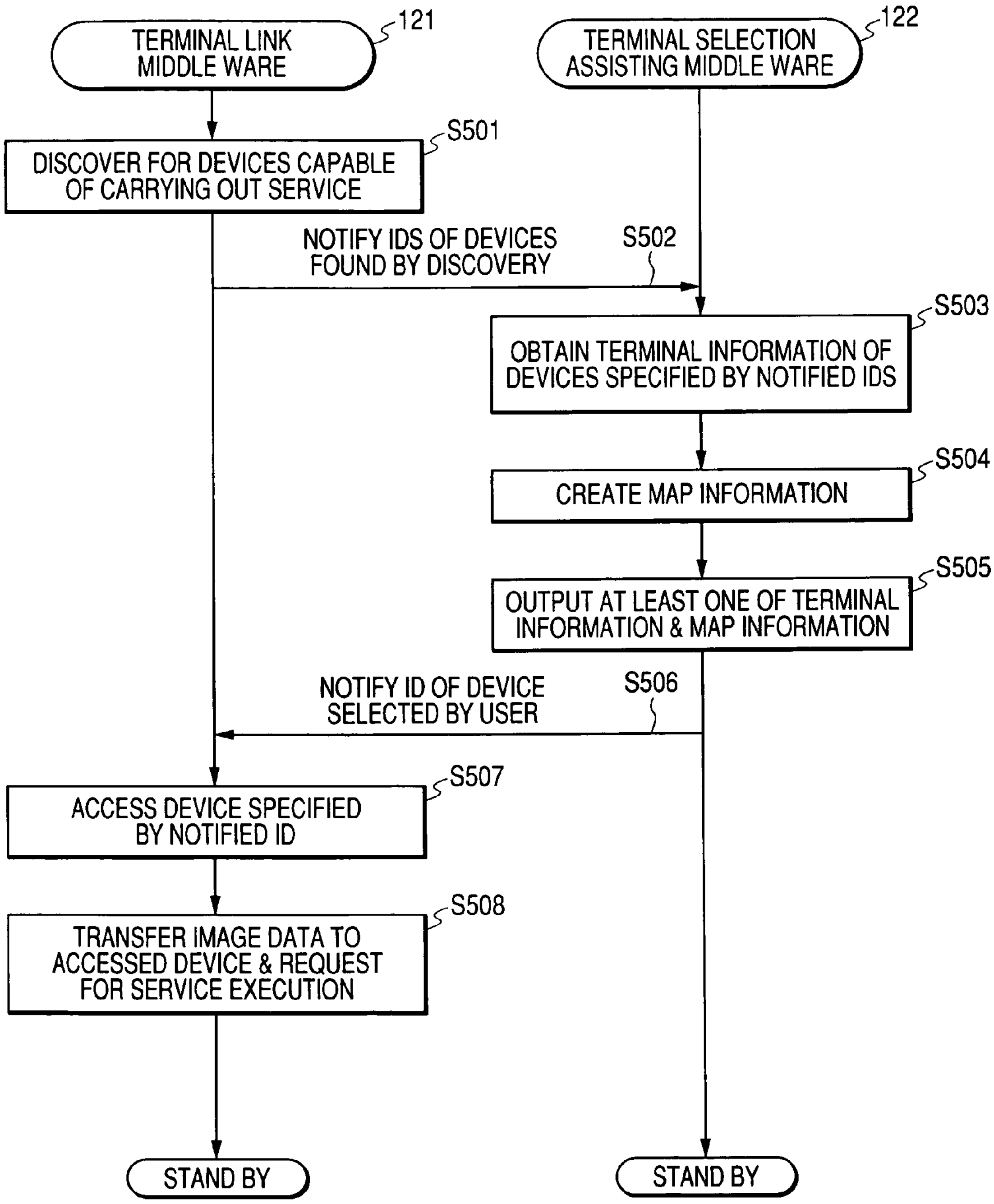
FIG. 5 is a flowchart for use in illustration of the operation of terminal link middle ware and terminal selection assisting middle ware carried out by a cellphone in the terminal link system for use in illustration of the first embodiment.

FIG. 5 is a flowchart for use in illustration of the operation of the terminal link middle ware 121 and the terminal selection assisting middle ware 122 carried out by the cellphone 1 in the terminal link system for use in illustration of the first embodiment.

When the user of the cellphone 1 carries out operation to start an image display service, the terminal link middle ware 121 starts to discover for a device capable of carrying out the image display service (S501) and notifies the IDs of the devices found by the discovery to the terminal selection assisting middle ware 122 (S502). The IDs notified in this case are those of the PDA 2, television 3, television 4, and the PC 6 that can carry out the image display service.

Figure 6:
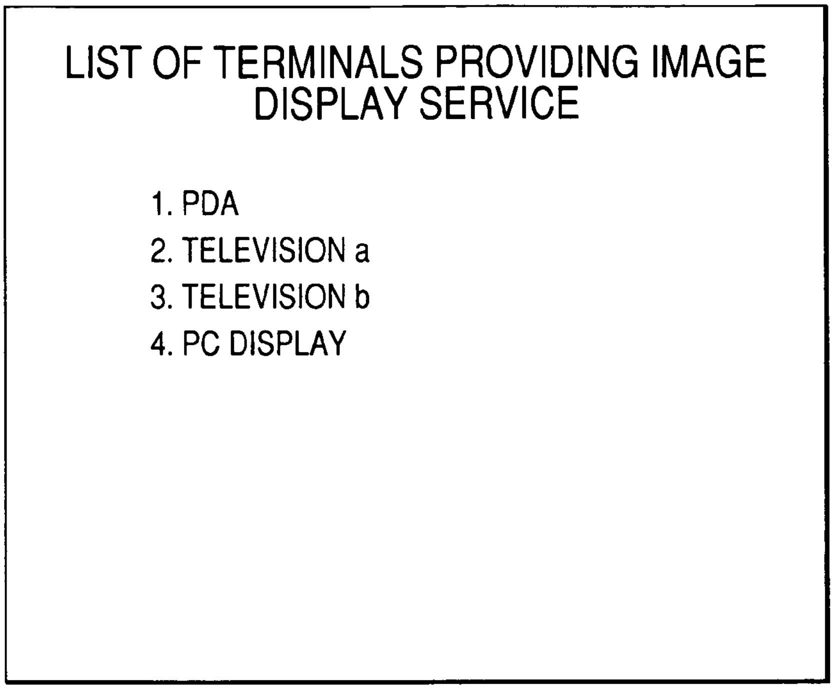
FIGS. 6 to 8 are views showing examples of how information representing characteristics of devices capable of carrying out a service are displayed on the screen.
Figure 7:
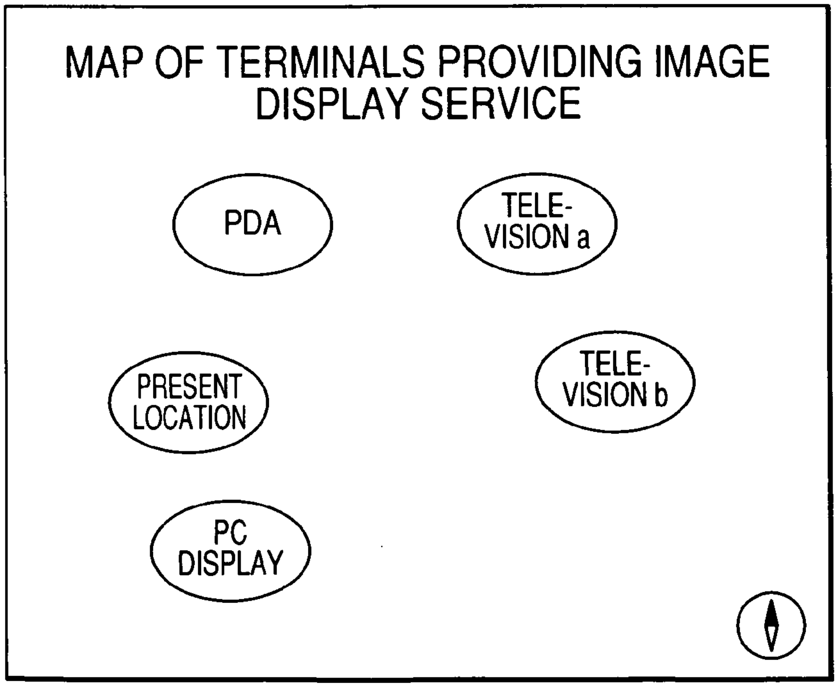

The terminal selection assisting middle ware 122 accesses the devices specified by the notified IDs, obtains their terminal information (S503) and creates map information based on the obtained terminal information and the positional information of the cellphone 1 (S504). At least one of the information related to the names of the devices included in the terminal information and the map information is output to the display working as the output device of the cellphone 1 (S505). In this way, images as shown in FIGS. 6 and 7 are displayed at the display of the cellphone 1. Note that the terminal selection assisting middle ware 122 can change the content of information to be displayed at the display depending on the display capability of the display of the cellphone 1.

Meanwhile, when the terminal selection assisting middle ware 122 selects a device other than the cellphone 1 according to Variations 1 to 4 and outputs at least one of terminal information and map information to the selected device, any of the screen images as shown in FIGS. 6 and 7 is displayed at the display of the selected device. Here, when a device having a large size display such as the television 4 is selected, the characteristics of the devices capable of carrying out the image display service can be displayed in more detail. When the selected device is remote from the cellphone 1, the characteristics of the devices capable of carrying out the image display service can be indicated in large characters.

The user refers to the information displayed at the display of the cellphone 1 or the display of another device and selects for example the PDA 2. The user may select one in the list as shown in FIG. 6 displayed at the display of the cellphone 1 or one icon in the map as shown in FIG. 7.

When the user selects the PDA 2, the ID of the PDA 2 is notified to the terminal selection assisting middle ware 122, from which the ID is notified to the terminal link middle ware 121 (S506). The terminal link middle ware 121 accesses the PDA 2 based on the notified ID (S507), transfers image data specified by the user and requests a service to be carried out (S508). In this way, the FDA 2 carries out the service and an image based on the image data transferred from the cellphone 1 is displayed at the display of the PDA 2. Using the service, when the cellphone 1 serves as a TV phone for example, the user can enjoy conversation with the other party while the image of the face of the other party is displayed at the display of a device other than the cellphone 1.

Note that in the above case, information about the characteristics of the devices capable of carrying out the service or a map indicating the relative positional relation between the device and the cellphone 1 is displayed at the display of the cellphone 1 or the display of another device. In addition to these kinds of information, the IDs of the devices may be displayed. In this case, the IDs may be included in the terminal information to be output.

In the system according to the embodiment described above, the list of the names of the devices (see FIG. 6) capable of carrying out a service specified by the user of the cellphone 1 may be displayed at the display of the cellphone 1 or the display of another device. Therefore, the user of the cellphone 1 may know which device can provide the service specified by himself/herself correspond with which element of the list and can also select a desired device instantaneously based on the name when the desired device is previously determined.

In the system according to the embodiment, a map (see FIG. 7) indicating the relative positional relation between the devices capable of carrying out the service specified by the user of the cellphone 1 and the cellphone 1 may be displayed at the display of the cellphone 1 or the display of another device. Therefore, the user of the cellphone 1 can effortlessly discern where the devices capable of carrying out the service are located based on the map and may easily select a device desired by the user to carry out the service.

When there are an enormous number of the devices capable of carrying out the service, the screen should be scrolled or characters must be reduced in size in order to check the list or map on the device having a small display such as the cellphone 1, which is cumbersome. Meanwhile, in the system according to the embodiment, the display device of an external device other than the cellphone 1 may be used to display the list or map. Therefore, the list or map may be displayed using a television whose display has a large size screen, so that the list or map can easily be checked.

In the system according to the embodiment, the list or map may be displayed at the display of a device whose screen surface is directed to the cellphone 1. Therefore, the user of the cellphone 1 does not have to look for which device displays the list or map at the display. Consequently, the user of the cellphone 1 can select a desired device to carry out the service easily and quickly.

In the system according to the embodiment, the above-described list and map can be checked at the display of the device located in the closest location to the cellphone 1, in other words, the map or list can be checked in the close vicinity, and therefore the desired device for carrying out the service can be selected easily and quickly.

Figure 8:
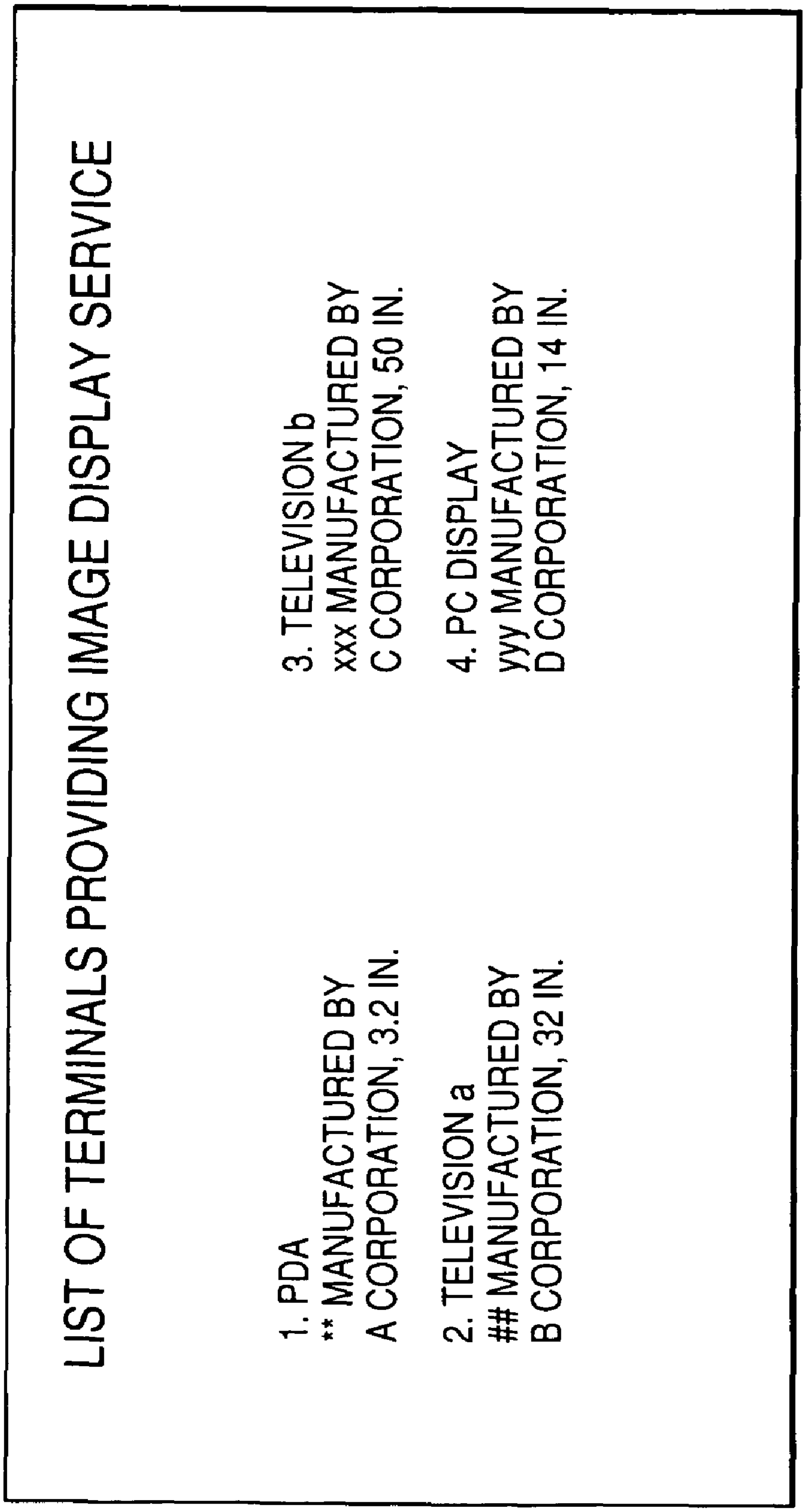

In the system according to the embodiment, the content of the above-described list or map can be changed based on the characteristics of the device that displays the list or map. For example, using a display with a large size screen, information other than the names of the devices may be added to the list (see FIG. 8). In this way, the user of the cellphone 1 can know details of the characteristics of the devices capable of carrying out the service. Consequently, the user of the cellphone 1 can more surely select a device capable of carrying out the service.

It is possible to control the above described devices by a program product comprising a computer usable medium having computer readable program code therein. The program code having program code means for making the devices to execute the steps shown in FIG. 5.

Second Embodiment

In a terminal link system for use in illustration of a second embodiment of the invention, the function of the terminal selection assisting middle ware 122 has a different function from that in the devices of the terminal link system described in conjunction with the first embodiment. Therefore, in the following description of the second embodiment, the function of the terminal selection assisting middle ware in the devices will be detailed.

Figure 9:
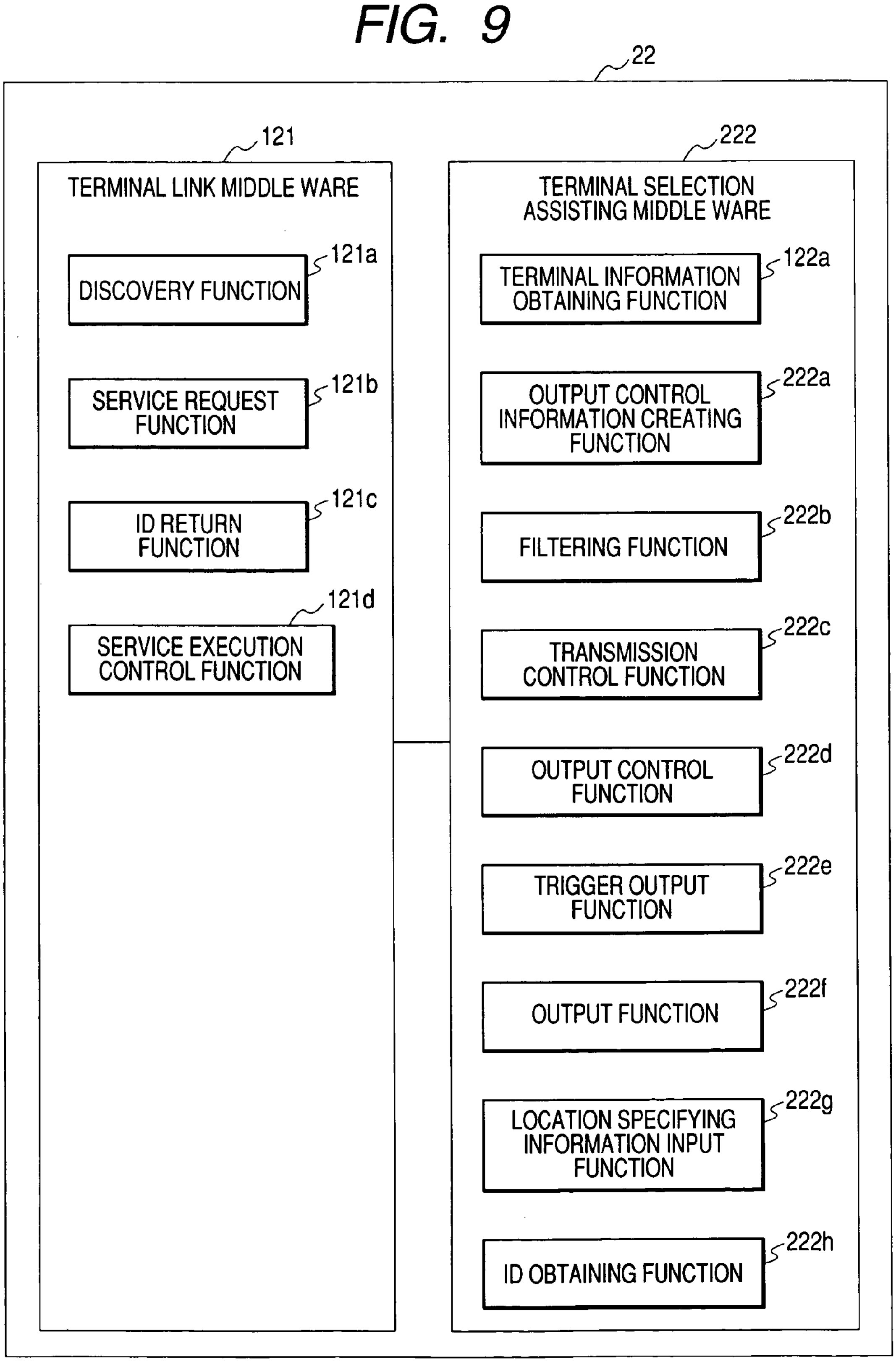
FIG. 9 is a diagram showing in detail the network configuration of middle ware in devices in a terminal link system for use in illustration of a second embodiment of the invention.

FIG. 9 is a diagram showing in detail the middle ware in the devices in the terminal link system for use in illustration of the second embodiment. Note that the same functions as those in FIG. 3 are denoted by the same reference characters.

The middle ware 22 includes terminal link middle ware 121 and terminal selection assisting middle ware 222.

The terminal selection assisting middle ware 222 includes a terminal information obtaining function 122*a*, an output control information creating function 222*a*, a filtering function 222*b*, a transmission control function 222*c*, an output control function 222*d*, a trigger output function 222*e*, an output function 222*f*, a location specifying input function 222*g*, and an ID obtaining function 222*h*.

The output control information creating function 222*a* creates output control information to cause a device capable of carrying out a service specified by the user of the cellphone 1 to create output indicating the capability.

The filtering function 222*b* refines the devices is found by the discovery function 121*a* using the terminal information obtained by the terminal information obtaining function 122*a*. The filtering condition can be set by the user of the cellphone 1. For example, "any device whose service fee is not more than a prescribed value" among the devices capable of carrying out the service may be set as the condition, so that the devices can be extracted to those satisfying the condition. When important image data or audio sound data is transferred to another device, the devices may be extracted to those with a high security function to prevent the image data or audio sound data from being leaked, so that data leakage can be minimized. In addition to the above, the location of the devices (the direction to or the distance from the cellphone 1, the moving direction of the cellphone 1 and the like), the load of the terminal, the presence/absence of the terminal using authority and the like can be filtering conditions.

The transmission control function 222*c* controls output control information created by the output control information creating function 222*a* to be transmitted to the devices found by the discovery function 121*a* or extracted by the filtering function 222*b*.

The output control function 222*d* receives the output control information transmitted from a device other than the cellphone 1 and causes the output device 17 of the cellphone 1 to create the output as described above based on the received output control information. The manner of outputting by the output device 17 includes emitting light, indicating the capability of carrying out the service by letters at the display, causing a vibrator to vibrate, and outputting audio sounds from a speaker.

The trigger output function 222*e* outputs a trigger to request devices in an arbitrary range among those that have made the output to return its ID. According to the embodiment, visible rays output from a visible rays output device, an example of the output device 17, is used as the trigger. More specifically, the illumination range of the visible rays output from the visible rays output device corresponds to the above described arbitrary range. The user of the cellphone 1 directs the visible rays in the range in which a device desired by the user to carry out the service among the plurality of devices that have made the output is located, and the devices, upon detecting the visible rays, return their IDs. In this way, if an enormous number of device have made the output, the devices can be extracted using the visible rays. Note that according to the embodiment, the devices each have a detecting function for detecting the visible rays and the ID returning function 121*c* of the terminal link middle ware 121 returns the ID in response to the visible rays.

The output function 222*f* receives the IDs returned in response to the trigger and outputs information having the received IDs in the form of a list to the display of output device 17. The list of IDs is displayed at the display of the cellphone 1 based on the information.

The location specifying information input function 222*g* inputs location specifying information to indicate an arbitrary location on the PAN 7 specified by the user of the cellphone 1.

The ID obtaining function 222*h* uses the location specifying information input by the location specifying information input function 222*g* to obtain the ID of a device in the closest location to the arbitrary location on the PAN 7 specified based on the location specifying information among the devices found by the discovery function 121*a* or those obtained by the filtering function 222*b*.

The ID obtaining function 222*h* compares the terminal information of the devices found by the discovery function 121*a* or the filtering function 222*b* and the location specifying information as described above and determines the device the closest to the location specified by the location specifying information. Then, the ID obtaining function 222*h* accesses the determined device through the OS 13 and the Bluetooth interface 14 and obtains the ID of the device.

Now, the operation of the cellphone 1 when the user uses an image display service will be described.

Figure 10:
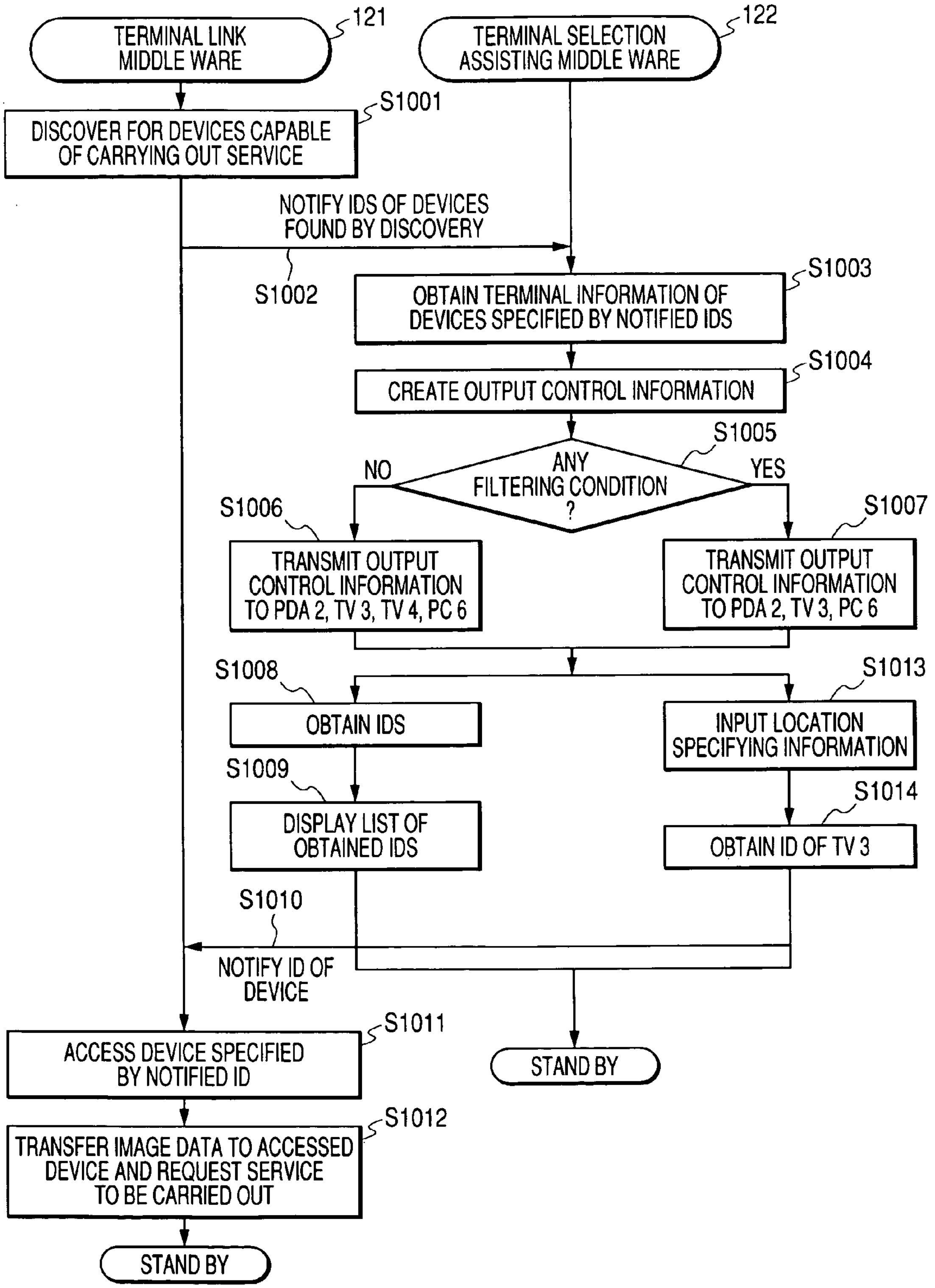
FIG. 10 is a flowchart for use in illustration of the operation of terminal link middle ware and terminal selection assisting middle ware carried out by a cellphone in the terminal link system for use in illustration of the second embodiment.

FIG. 10 is a flowchart for use in illustration of the operation of terminal link middle ware 121 and terminal selection assisting middle ware 222 carried out by a cellphone 1 in the terminal link system for use in illustration of the second embodiment.

When the user of the cellphone 1 carries out operation to start image display service, the terminal link middle ware 121 starts to discover for devices capable of carrying out the image display service (S1001) and notifies the IDs of the devices found by the discovery to the selection assisting middle ware 222 (S1002). The IDs notified in this case are those of the PDA 2, television 3, television 4, and the PC 6.

Figures 11, 12:
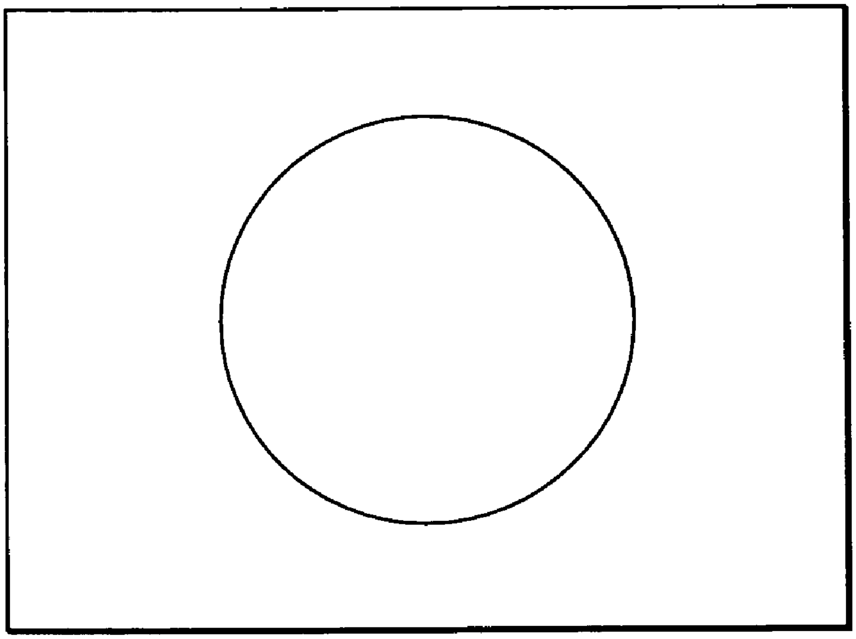
FIG. 11 is a view showing an example of how a device capable of carrying out a service creates output indicating the capability on the display.
FIG. 12 is a table showing an example of output control information.

The terminal selection assisting middle ware 222 accesses the devices specified by the notified IDs, obtains their terminal information (S1003) and creates output control information (S1004). Then, the terminal selection assisting middle ware 222 determines whether or not a condition to filter the devices is set by the user of the cellphone 1, and if there is no condition set (NO in S1005), the output control information is transmitted to the devices specified by the notified IDs (S1006). The PDA 2, the television 3, the television 4, and the PC 6 receive the output control information and have an image such as a large "○" as shown in FIG. 11 displayed at their displays.

Meanwhile, when a condition to refine the devices is set by the user of the cellphone 1 (YES in S1005), the terminal selection assisting middle ware 222 checks the condition. If the filtering condition specifies for example "any device whose service fee is not more than 100 yen," the terminal selection assisting middle ware 222 refers to the terminal information obtained by the terminal information obtaining function 122*a* and specifies the devices whose service fees are not more than 100 yen. In this example, the PDA 2, the television 3, and the PC 6 are specified. The terminal selection assisting middle ware 222 transmits the output control information to the PDA 2, the television 3, and the PC 6 specified as described above (S1007). The PDA 2, the television 3, and the PC 6 receive the output control information and have an image such as a large "○" as shown in FIG. 11 displayed at their displays.

When the image of "○" is displayed at the displays of the devices and the user operates the cellphone 1 to direct visible rays to devices in an arbitrary range among them, the devices irradiated with the visible rays return their IDs. In this example, assume that only the televisions 3 and 4 are irradiated with the visible rays among the PDA 2, the television 3, the television 4, and the PC 6. The terminal selection assisting middle ware 222 obtains the IDs returned from the televisions 3 and 4 (S1008) and lets the display of the cellphone 1 display the ID list (S1009). Note that a name list based on the terminal information of the televisions 3 and 4 may be displayed instead of the ID list.

The user of the cellphone 1 refers to the list displayed at the display of the cellphone 1 and selects for example the television 3. Once the user selects the television 3, the ID of the television 3 is notified to the terminal selection middle ware 222, from which the ID is also notified to the terminal link middle ware 121 (S1010). The terminal link middle ware 121 accesses the television 3 based on the notified ID (S1011), transfers image data specified by the user and requests the service to be carried out (S1012). In this way, the service is carried out by the television 3, so that an image based on the image data transferred from the cellphone 1 is displayed at the display of the television 3.

When the image of "○" is displayed at the displays of the devices as described above and the user of the cellphone 1 specifies an arbitrary location on the PAN 7, the terminal selection assisting middle ware 222 inputs location specifying information (S1013), obtains the ID of the television 3 the closest to the arbitrary location using the input location specifying information (S1014), and notifies the obtained ID to the terminal link middle ware 121 (S1010). Then, the process proceeds to S1011.

As described above, in the system according to the embodiment, the devices capable of carrying out a service can create output indicating their capability of carrying out the service, so that the user of the cellphone 1 can instantaneously discern which devices in the PAN 7 can carry out the service. Therefore, the time required for selecting a device may be reduced.

In addition, in the system according to the embodiment, devices extracted using the terminal information of these devices among the devices capable of carrying out the service can create output indicating their capability of carrying out the service. Therefore, if the network configuration of the group of communicable/available devices changes as devices move, only the devices satisfying the condition can be subjected to selection by the user. If there are an enormous number of devices capable of carrying out the service, the number of devices subjected to selection by the user of the cellphone 1 can be reduced. Consequently, the time required for selecting a device may be reduced.

In the system according to the embodiment, the authority to use a device is set as a filtering condition, so that the case of a plurality of people accessing the same device at the same time is easily arbitrated, and the time required for selecting a device may be reduced, which is advantageous in practical environments where there may be more than one users.

In the system according to the embodiment, the extracted devices may be irradiated with visible rays to be further extracted. Therefore, when there are still many devices after filtering by the filtering function, the number of devices subjected to selection by the user of the cellphone 1 can be reduced. Consequently, the time required for selecting a device may be reduced.

In the system according to the embodiment, location specifying information is input by operating the cellphone 1, so that a single device can be determined among the extracted devices. Therefore, when there are still many devices after filtering by the filtering function, the number of devices subjected to selection by the user of the cellphone 1 can be reduced. Consequently, the time required for selecting a device may be reduced.

Note that in the above example, the devices that have received the output control information create output indicating their capability of carrying out the service, and the output timing may be prescribed. In this case, the output control information creating function 222*a* creates the output control information with the determined timing using the terminal information of the devices found by the discovery function 121*a* or those extracted by the filtering function 222*b*.

FIG. 12 is a table showing an example of the output control information created by the output control information creating function 222*a*.

As shown in FIG. 12, the output control information has a defined output order for the devices. The "ID" represents the ID of a device to be the destination of the output control information. The "order" is information that defines when the device specified by the ID outputs. The "interval" refers to the time interval between when a device outputs and when the next device outputs.

The output function 222*f* of the PDA 2, upon receiving the output control information as given in FIG. 12, checks the "order" and "interval" defined for the ID of its own device and controls the device to output five seconds after the television 3 outputs for five seconds based on them. The order defined in this example may be anti-clockwise from the PC 6 in the closest location to the cellphone 1 or in the order in proportion to the distance from the cellphone 1 starting from the closest device, so that the user of the cellphone 1 can quickly determine the device in the closest location to him/her.

Note that the "order" may be set by the user of the cellphone 1. For example, the device whose display has its display surface faced to the side of the cellphone 1 may be given the priority to output first, or the order may be set so that the devices having lower fees are given priorities to output or that those having higher image display capabilities are given priorities to output.

To indicate available devices, for example, the "circle" is displayed, the screen is emitted, or such. As shown in the FIG. 12, there is only a device which is under output operation at one time in the PAN. Therefore, an user can select the available device by pushing a particular button ("SELECT", or such).

In the other words, it is possible to select an available device without analyzing contents of the list, by that the user pushes the button at timing when an intended device is under output operation. Therefore, the selection method described in this embodiment is convenience for users.

It is possible to control the above described devices by a program product comprising a computer usable medium having computer readable program code therein. The program code having program code means for making the devices to execute the steps shown in FIG. 10.

Third Embodiment

In a terminal link system according to a third embodiment of the invention, the terminal selection middle ware 122 has a different function from that in the devices in the terminal link system described in conjunction with the second embodiment. Therefore, in the following description of the embodiment, the function of the terminal selection assisting middle ware in the devices will be detailed.

Figure 13:
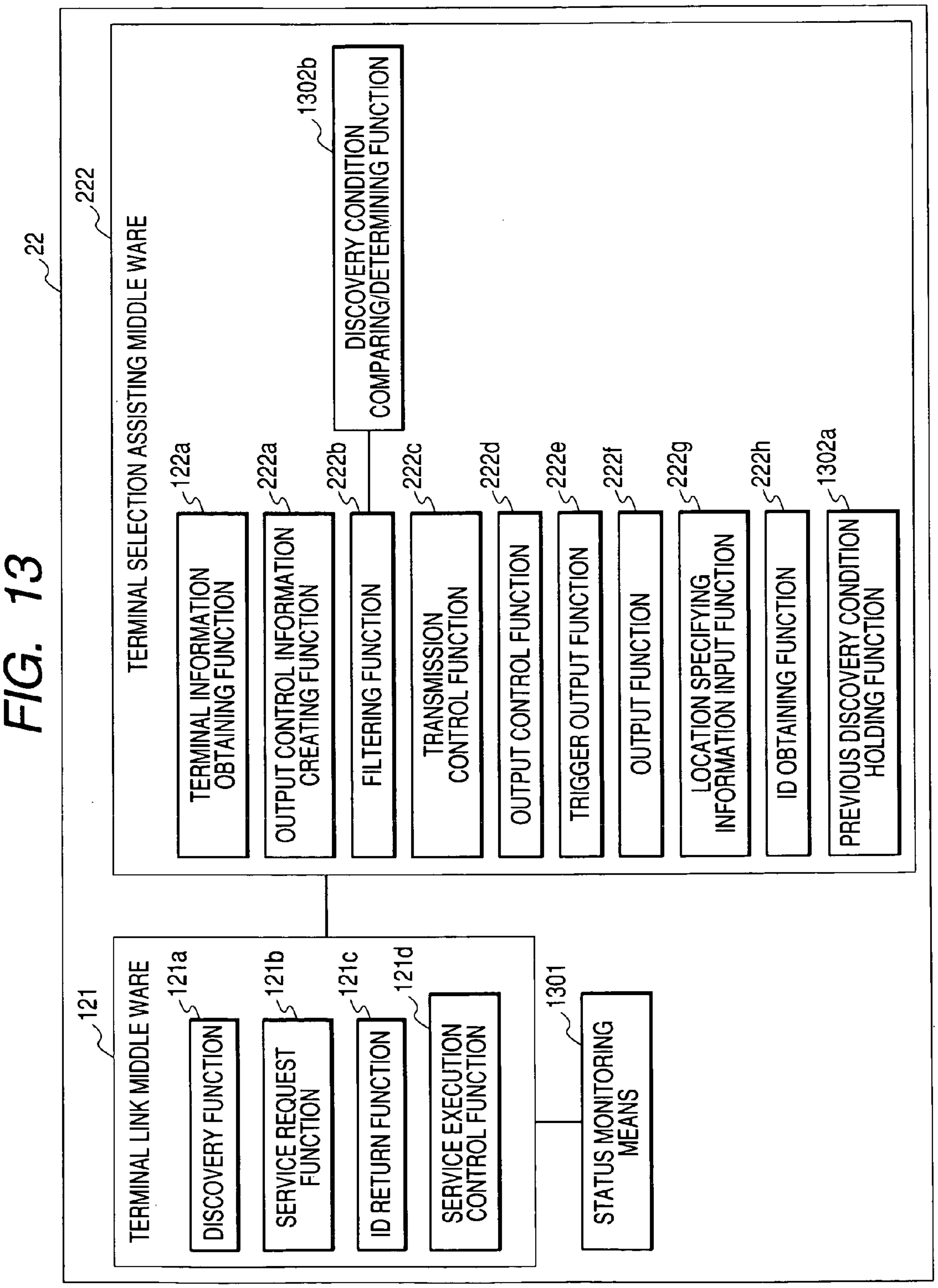
FIG. 13 is a diagram showing in detail the network configuration of middle ware in devices in a terminal link system for use in illustration of a third embodiment of the invention.

FIG. 13 is a detailed diagram of middle ware in the devices in the terminal link system for use in illustration of the third embodiment. Note that the same functions as those in FIG. 9 are denoted by the same reference characters.

The middle ware 22 includes terminal link middle ware 121, terminal selection assisting middle ware 222, and status monitoring means 1301 for detecting whether or not to change the terminal link network configuration.

The terminal selection assisting middle ware 222 includes a terminal information obtaining function 122*a*, an output control information creating function 222*a*, a filtering function 222*b*, a transmission control function 222*c*, an output control function 222*d*, a trigger output function 222*e*, an output function 222*f*, a location specifying information input function 222*g*, an ID obtaining function 222*h*, a discovery condition holding function 1302*a* that holds the discovery condition of the last discovery, and a discovery condition comparing/determining function 1302*b* that determines a discovery condition based on the held discovery condition and information from the status monitoring means 1301.

Now, the operation of the cellphone 1 when the user of the cellphone 1 uses an image display service will be described.

Figure 14:
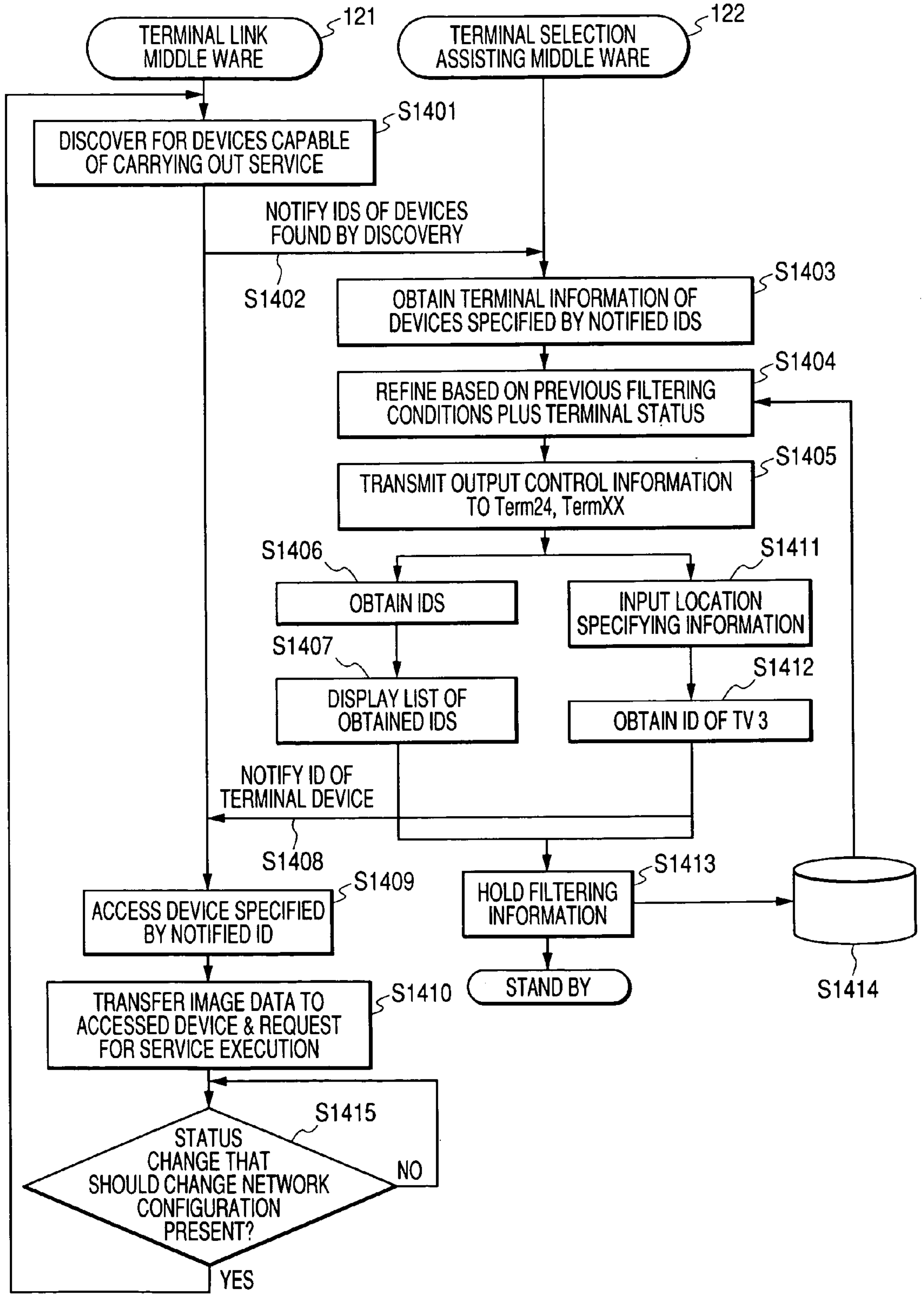
FIG. 14 is a flowchart for use in illustration of the operation of terminal link middle ware and terminal selection assisting middle ware carried out by a cellphone in the terminal link system for use in illustration of the third embodiment.

FIG. 14 is a flowchart for use in illustration of the operation of terminal link middle ware 121 and the terminal selection assisting middle ware 122 carried out by the cellphone 1 in the terminal link system for use in illustration of the embodiment.

When the user of the cellphone 1 carries out operation to start an image display service, the terminal link middle ware 121 starts to discover for devices capable carrying out the image display service (S1401) and notifies the IDs of the devices found by the discovery to the terminal selection assisting middle ware 122 (S1402). The IDs notified in this example are those of the PDA 2, the television 3, the television 4, and the PC 6 that are all capable of carrying out the image display service.

The terminal selection assisting middle ware 222 accesses the devices specified by the notified IDs and obtains their terminal information (S1403). Then, the terminal selection assisting middle ware 222 compares information from the status monitoring means 1301, the previous discovery condition held by a previous discovery condition holding function 1302*a* (S1414) and the terminal information for refinement and creates output control information (S1404). In the filtering process, if various conditions such as “any device whose service fee is not more than 100 yen” is set, the terminal selection assisting middle ware 222 specifies devices based on the combination of the conditions. The terminal selection assisting middle ware 222 transmits the output control information to the devices specified by the notified IDs (S1405). The PDA 2, the television 3, the television 4, and the PC 6 receive the output control information and let their displays display for example an image such as a large “○” as shown in FIG. 11.

while the image of “○” is displayed at the displays of the devices and the user of the cellphone 1 operates the cellphone 1 to direct visible rays to devices in an arbitrary range among them, the devices irradiated with the visible rays return their IDs. In this example, assume that the televisions 3 and 4 are irradiated with the visible rays among the PDA 2, the television 3, television 4, and the PC 6. The terminal selection assisting middle ware 222 obtains the IDs returned from the televisions 3 and 4 (S1406) and let the display of the cellphone 1 display the list of the IDs (S1407) Note that a name list based on the terminal information of the televisions 3 and 4 may be displayed instead to the ID list.

The user of the cellphone 1 refers to the list displayed at the display of the cellphone 1 and selects for example the television 3. The ID of the television 3 selected by the user is notified to the terminal selection assisting middle ware 222, from which the ID is notified to the terminal link middle ware 121 (S1408) The terminal link middle ware 121 accesses the television 3 based on the notified ID (S1409), transfers image data specified by the user and requests the service to be carried out (S1410). In this way, the television 3 provides the service and an image based on the image data transferred from the cellphone 1 is displayed at the display of the television 3.

As described above, when the image of “○” is displayed at the displays of the devices and the user of the cellphone 1 specifies an arbitrary location on the PAN 7, the terminal selection assisting middle ware 222 inputs location specifying information (S1411), obtains the ID of the television 3 in the closest location to the arbitrary location based on the input location specifying information (S1412), and notifies the obtained IDs to the terminal link middle ware 121 (S1408). Then, the process proceeds to S1409.

After the terminal selection ends, the terminal selection assisting middle ware 222 holds the filtering conditions until then (S1413) for use in the next discovery.

The status monitoring means 1301 checks the status as required and notifies a detected large change if any (YES in S1416) to the terminal link middle ware 121, and the terminal link middle ware 121 starts to discover again (S1401). At the time, what is monitored may be the load of the device, the call secrecy, the moving speed and the like. Load fluctuations can be detected by monitoring the CPU or monitoring for other users to take part. The secrecy may be detected by recognizing communication media contents such as audio sound recognition, or by specifying the secrecy as a control signal on both user sides.

When change in the status caused by the load of the device is detected, it may be the case in which a number of people can use the device to be linked with. In this case, when another user starts to use the same terminal, the operation load of the terminal increases, which refines available resources by the user. The status monitoring means 1301 monitors for such a status and discovery is carried out again using the previous discovery conditions.

When for example change in the status caused by the secrecy of call is detected, the following case is likely. When for example the party to be linked with has a display with a large size screen placed in a public environment, the display content can be known to people around the display. Even at home or in the office, people other than the user can look at the display. Similarly, when the other party to be linked with is a speaker, audio sounds are audible to the periphery. In these cases, the secrecy cannot be secured. The status monitoring means 1301 monitors for the content of call and carries out another discovery based on the necessary secrecy level and the previous discovery conditions when it is determined that greater secrecy is needed.

When for example change in the status by the moving speed is detected, the communication with the linked party may be disconnected. In this case, the status monitoring means 1301 carries out another discovery based on the moving speed of its terminal and the previous discovery conditions.

The system according to the embodiment includes the status monitoring means that detects change in the load of the terminal, the call secrecy, the moving speed and the like in addition to the second embodiment, and using the status information in addition to the previous filtering conditions at the time of re-discovering, the service request terminal can start re-discovering in order to automatically change the combination of devices in response to change in the load of the liked terminal or the call secrecy, so that the user comfort or privacy can be secured in a high level.

The status is included in the filtering condition when the discovery condition for re-discovering is determined, and therefore such a device link environment can be secured that more groups of candidate devices to be linked with can be eliminated, the user's labor for selecting can be alleviated, and change in the status can dynamically be addressed. The re-discovering can automatically be carried out, and for example the user can be requested to carry out re-discovering.

It is possible to control the above described devices by a program product comprising a computer usable medium having computer readable program code therein. The program code having program code means for making the devices to execute the steps shown in FIG. 14.

What is claimed is:

1. A service request terminal included in a network, the network having a plurality of terminals connected with one another by wireless communication, the service request terminal comprising:

a discovery means for discovering at least one terminal, among the plurality of terminals, working as a service providing terminal capable of carrying out prescribed processing based on a request issued by the service request terminal;

a terminal information obtaining means for obtaining terminal information indicating a status with respect to the availability of the at least one terminal found by the discovery means to perform said prescribed processing;

an output means for outputting the terminal information obtained by the terminal information obtaining means to an output device of the service request terminal; and a transmission control means for transmitting output control information to each of the at least one terminal found by the discovery means to cause the at least one terminal to create an output using an output device of said at least one terminal accessible by a person for indicating a capability of carrying out the prescribed processing so as to be perceptible to the person, wherein said output is one or more of a sound, displayed information, and/or a vibration by said at least one terminal to indicate to the person the capability of carrying out the prescribed processing.

2. The service request terminal according to claim 1, further comprising: output control information creating means for creating the output control information.

3. The service request terminal according to claim 1, wherein the output is outputting audio sounds.

4. The service request terminal according to claim 1, wherein the output is causing a vibrator to vibrate.

5. The according to claim 1, further comprising:

a trigger output means for outputting a trigger to a device in an arbitrary range among the at least one terminal located on the destination side of the output control information, the trigger requesting specifying information for specifying the terminal to be returned; and an obtaining means for obtaining specifying information transmitted from the terminal in the range in response to the trigger.

6. The service request terminal according to claim 1, further comprising:

a map information creating function operable to create relative positional information indicating a relative positional relationship between the at least one terminal found by the discovery means and the service request terminal by using the obtained terminal information; and a display for displaying said map to a person using the service request terminal to aid in finding the at least one terminal.

7. The service request terminal according to claim 1, wherein the output means outputs the obtained terminal information of at least one terminal found by the discovery means to the output device.

8. The service request terminal according to claim 1, further comprising: a filtering means for filtering the at least one terminal found by the discovery means using the terminal information obtained by the terminal information obtaining means.

9. The service request terminal according to claim 2, wherein the output control information creating means creates the output control information using the obtained terminal information to cause the at least one terminal found by the discovery means to create an output in a timing designed by a user.

10. The service request terminal according to claim 2, wherein the output control information creating means creates the output control information using the obtained terminal information to cause the at least one terminal found by the discovery means to create an output in a determined timing.

11. The service request terminal according to claim 2, wherein the output is indicating letters or symbols at a display.

12. The service request terminal according to claim 5, wherein the trigger is a visible ray.

13. The service request terminal according to claim 7, wherein the output means selects a terminal in the closest location to the service request terminal as an output destination among the least one terminal by using the terminal information.

14. The service request terminal according to claim 7, wherein the output means selects a terminal having the largest size screen as an output destination among the at least one terminal by using the terminal information.

15. The service request terminal according to claim 7, wherein the output means selects a terminal having its display facing the service request terminal as an output destination among the at least one terminal by using the terminal information.

16. The service request terminal according to claim 8, wherein the filtering means uses a discovery condition used by the discovery means for filtering the at least one terminal.

17. The service request terminal according to claim 8, further comprising:

a status monitoring means for monitoring the status of the service request terminal and the at least one terminal found by the discovery means, wherein the filtering means refines the filtering of the at least one terminal depending on a change in the status monitored by the status monitoring means.

18. The service request terminal according to claim 8, wherein the filtering means refines the filtering of the at least one terminal based on information of authorization for use.

19. The service request terminal according to claim 17, wherein the status monitoring means is capable of detecting a communication status with each of the least one terminal based on its moving speed.

20. The service request terminal according to claim 17, wherein the status monitoring means is capable of detecting a communication content.

21. A service providing terminal comprising:

means for providing a status with respect to the availability of said service providing terminal to perform prescribed processing in response to a request for said prescribed processing received from a service request terminal for displaying said status on an output device of said service request terminal; and an output control means for receiving an output control information from said service request terminal, which causes an output device of the service providing terminal to create an output indicating to a person a capability of carrying out the prescribed processing so as to be perceptible to the person, and having said output device of the service providing terminal create the output wherein said output is one or more of a sound, displayed information, and/or a vibration by said service providing terminal to indicate to the person the capability of carrying out the prescribed processing.

22. The service providing terminal according to claim 21, wherein the output is indicating letters at the display.

23. The service providing terminal according to claim 21, wherein the output is outputting audio sounds.

24. The service request terminal according to claim 21, wherein the output is causing a vibrator to vibrate.

25. The service providing terminal according to claim 21, further comprising: an ID returning means for transmitting an ID of the service providing terminal in response to a trigger outputted from the service request terminal, the trigger requesting specifying information for specifying a terminal to be returned.

26. A non-transitory computer readable medium medium encoded with a computer program for controlling a service request terminal included in a network, the network having a plurality of terminals connected with one another by wireless communication, the non-transitory computer readable medium comprising code for, when executed by a processor, performing a method including the steps of:

issuing a request regarding a prescribed processing to at least one of the plurality of terminals;

discovering at least one terminal, among the plurality of terminals, working as a service providing terminal capable of carrying out the prescribed processing based on the request;

obtaining terminal information indicating a status with respect to the availability of the at least one terminal for performing said prescribed processing;

outputting the terminal information to an output device of the service request terminal; and transmitting an output control information to each of the at least one terminal found by the discovering step to cause an output device of the at least one terminal to create an output indicating a capability of carrying out the prescribed processing so as to be perceptible to a person wherein said output is one or more of a sound, displayed information, and/or vibration of the at least one terminal to indicate to the person the capability of carrying out the prescribed processing.

27. A non-transitory computer readable medium medium encoded with a computer program for performing the method of:

providing a status with respect to the availability of a service providing terminal to perform prescribed processing in response to a request for said prescribed processing received from a service request terminal for displaying said status on an output device of said service request terminal wherein said output is one or more of a sound, displayed information, and/or vibration by the service providing terminal to indicate to the person the capability of carrying out the prescribed processing, receiving an output control information from the service request terminal, in response to said receiving, the service providing terminal creating an output indicating a capability of carrying out the prescribed processing so as to be perceptible to a person, and an output device of the service providing terminal providing the output to the person.

28. A service request terminal for connecting to a short-range wireless network having a plurality of networked terminals all connected with one another by wireless communication on said wireless network in a particular geographical area covered by said short-range network, the service request terminal comprising:

a user interface means for obtaining a request for prescribed processing from a user of said terminal;

a discovery means for polling said networked terminals with a request for performing said prescribed processing, and further for receiving information from said networked terminals regarding said prescribed processing, wherein said discovery means uses said information received from said networked terminals regarding said prescribed processing to determine at least one of said networked terminals capable of performing said prescribed processing;

a terminal information obtaining means for obtaining terminal information indicating a current status with respect to the availability of the at least one terminal found by the discovery means to perform said prescribed processing;

a display for displaying an indication of the terminal information obtained by the terminal information obtaining means for indicating said status of the at least one terminal found by the discovery means to perform said prescribed processing;

a transmission control means for automatically transmitting output control information to the at least one terminal found by the discovery means to cause the at least one terminal to create an output using an output device of said at least one terminal accessible by a person in said particular geographical area for indicating a capability of carrying out the prescribed processing so as to be perceptible to the person, wherein said display also displays relative positional information indicating a relative positional relationship between the at least one terminal in said particular geographical location found by the discovery means and the service request terminal for indicating to the user the location of the at least one terminal with respect to the location of the service request terminal.

29. The service request terminal of claim 28, wherein said prescribed processing performed by said at least one terminal is one of: an audio output service, a display service, or a combination of a display and audio output service.

30. A service request terminal for connecting to a short-range wireless network having a plurality of networked terminals all connected with one another by wireless communication on said wireless network in a particular geographical area covered by said short-range network, the service request terminal comprising:

a user interface means for obtaining a request for prescribed processing from a user of said terminal;

a discovery means for polling said networked terminals with a request for performing said prescribed processing, and further for receiving information from said networked terminals regarding said prescribed processing, wherein said discovery means uses said information received from said networked terminals regarding said prescribed processing to determine which of said networked terminals is capable of performing said prescribed processing;

a terminal information obtaining means for obtaining terminal information indicating a current status with respect to the availability of the networked terminals capable of performing said prescribed processing to perform said prescribed processing;

a display for displaying a location of said networked terminals capable of performing said prescribed processing that have a status of being capable of performing said prescribed processing in said particular geographical location; and a transmission control means for automatically transmitting output control information to a selected one of said networked terminals capable of performing said prescribed processing based on a predetermined criteria comparing said networked terminals capable of performing said prescribed processing against teach other, wherein said control information is to cause the selected terminal to create an output using an output device of said selected terminal accessible by a person in said particular geographical area for indicating a capability of carrying out the prescribed processing so as to be perceptible to the person wherein said output includes information for instructing a display of the selected terminal to display information to indicate to the user the capability of the selected terminal of carrying out the prescribed processing.

31. The service request terminal of claim 30, wherein said prescribed processing is for displaying material on a display of said networked terminals, and wherein said predetermined criteria is based on a size of the displays.

32. The service request terminal of claim 30, further comprising a map information creating function operable to create a map showing a relative positional relationship between the selected terminal and the service request terminal, wherein said display also displays the map for indicating to the user the location of the selected terminal with respect to the location of the service request terminal.

33. A service request terminal for connecting to a short-range wireless network having a plurality of networked terminals all connected with one another by wireless communication on said wireless network in a particular geographical area covered by said short-range network, the service request terminal comprising:

a user interface means for obtaining a request for displaying information remotely from a user of said service request terminal;

a discovery means for polling said networked terminals with a request for performing said displaying, and further for receiving information from said networked terminals regarding said displaying, wherein said discovery means uses said information received from said networked terminals regarding said prescribed processing to determine which of said networked terminals is capable of performing said displaying;

a terminal information obtaining means for obtaining terminal information indicating a current status with respect to the availability of the terminals found by the discovery means to perform said displaying;

a display for displaying an indication of the terminal information obtained by the terminal information obtaining means for indicating said status of the terminals found by the discovery means to perform said prescribed processing, said indication including a map showing the relative positional relationship between the terminals found by the discovery means for indicating to the user the location of the discovered terminals with respect to the location of the service request terminal; and a transmission control means for automatically transmitting output control information to the at least one terminal found by the discovery means to cause the at least one terminal to create a display output that is perceptible by the user.

* * * * *

UNITED STATES PATENT AND TRADEMARK OFFICE

CERTIFICATE OF CORRECTION

PATENT NO. : 7,787,423 B2
APPLICATION NO. : 10/936100
DATED : August 31, 2010
INVENTOR(S) : Komiya et al.

It is certified that error appears in the above-identified patent and that said Letters Patent is hereby corrected as shown below:

In column 2, line 23, please delete the word “is”,

In column 8, line 10, please delete “FDA” and insert --PDA--,

In column 17, Claim 26, line 47, please delete the word “medium” (second occurrence), In column 18, Claim 27, line 8, please delete the word “medium” (second occurrence), In column 19, Claim 30, line 40, please delete the word “teach” and insert --each--.

Signed and Sealed this

Twenty-first Day of December, 2010

David J. Kappos

*Director of the United States Patent and Trademark Office*